Figure 1:
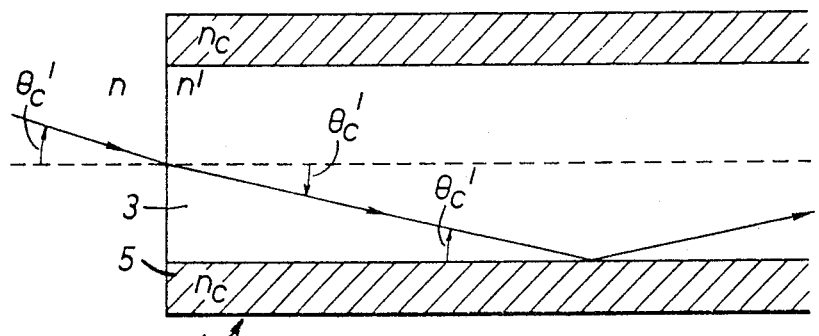

United States Patent [19]

Sabine

[11] 4,381,882
[45] May 3, 1983

[54] FIBRE OPTIC TERMINATION

[75] Inventor: Percy V. H. Sabine, Box Hill North, Australia

[73] Assignee: Australian Telecommunications Commission, Melbourne, Australia

[21] Appl. No.: 266,321

[22] Filed: May 22, 1981

Related U.S. Application Data

[63] Continuation of Ser. No. 78,465, Sep. 24, 1979, abandoned.

[30] Foreign Application Priority Data

Sep. 28, 1978 [AU] Australia .............................. PD6157

[51] Int. Cl.³ ................................................ G02B 7/26
[52] U.S. Cl. ................................. 350/96.20; 250/227; 350/96.15; 350/96.16
[58] Field of Search ............... 350/96.15, 96.16, 96.17, 350/96.20; 250/227

[56] References Cited

U.S. PATENT DOCUMENTS

| | | | |
|---|---|---|---|
| 4,012,149 | 3/1977 | Bouillie et al. | 350/96.15 X |
| 4,130,343 | 12/1978 | Miller et al. | 350/96.15 |
| 4,130,345 | 12/1978 | Doellner | 350/96.15 X |
| 4,149,770 | 4/1979 | Milton et al. | 350/96.15 |
| 4,165,496 | 8/1979 | Di Domenico, Jr. et al. | 350/96.15 X |
| 4,191,446 | 3/1980 | Arditty et al. | 350/96.15 |

FOREIGN PATENT DOCUMENTS

| | | | |
|---|---|---|---|
| 2751915 | 7/1978 | Fed. Rep. of Germany | 350/96.15 |
| 2328973 | 5/1977 | France | 350/96.15 |
| 52-2442 | 1/1977 | Japan | 350/96.15 |

OTHER PUBLICATIONS

Kuwahara et al., "A Semi-Transparent Mirror-Type Directional Coupler ... ", *IEEE Trans. on M'Wave Th. & Tech.*, Jan. 1975, pp. 179–180.

Timmermann, "Transverse Light Coupling From GaAs Lasers Into Optical Fibres", *Electr. Lett.*, vol. 13, No. 25, Dec. 1977, pp. 766–767.

Karr et al., "Lightwave Fiber Tap", *Applied Optics*, vol. 17, No. 14, Jul. 1978, pp. 2215–2218.

Wells, "Crosstalk in a Bidirectional Optical Fiber", *Fiber and Integrated Optics*, vol. 1, No. 3, 1978, pp. 243–287.

*Primary Examiner*—John D. Lee

[57] ABSTRACT

This specification discloses a new termination for optical light guides, the termination can be integrally formed at the ends of long light guides or made as discrete termination pieces which can be attached to light guides. The new terminations exhibit excellent input and output coupling characteristics and thus are especially suitable for photometric reflectometry measurement and for optical communications systems.

16 Claims, 28 Drawing Figures

FIBRE OPTIC TERMINATION

This is a continuation of application Ser. No. 078,465, filed Sept. 24, 1979, now abandoned.

There exists a requirement to simultaneously provide efficient input and output coupling of light at a single optical fibre end-face in at least two practical situations. These are: (1) optical time domain reflectometry to determine the attenuation of an optical fibre link, and (2) Two-way transmission of information along a single optical fibre. Both applications are currently of high research interest and promise to have large commercial markets. The coupling problem, as met in each of the situations is described below.

There has been recent agreement that optical time domain reflectometry promises to become the standard technique for measuring the attenuation of an optical fibre link both in laboratory and in field environments. The measurement involves the analysis of optical power back-scattered (Rayleigh scattering) from scattering centres along the fibre in response to an optical pulse of high energy but short time duration. A semi-conductor laser is a convenient source for this measurement (pulse with typically 5 ns, repetition rate 5 Kpps). As each pulse propagates down the fibre, a back-scattered wave is established and by using a low-noise optical receiver and signal averaging techniques, the back-scattered wave can be detected and displayed, for example, on an X-Y recorder. The vertical and horizontal axes of the graph thus produced represent back-scattered optical power (normally shown on a logarithmic scale in dBs) and time respectively. This time axis can be scaled to indicate distance along the fibre by noting the velocity of pulse propagation in the fibre core material. Then the fibre optical loss, in dB/km, is proportional to the slope of the received back-scattered intensity from the pulse input.

A common technique for achieving both input coupling of the laser diode pulse and output coupling of the back-scattered optical wave at a single fibre end-face requires a 3 dB beam-splitter positioned between the laser diode and the fibre end-face, a detector being positioned to receive light from the beam-splitter. There are however, two major disadvantages in this technique. First, the total input-output optical loss through the beam-splitter is 6 dB, 3 dB for the input pulse and 3 dB for the back-scattered wave. Because of the square law response of optical detectors, this 6 dB optical loss corresponds to a 12 dB electrical signal loss. Second, the comparatively high intensity, unwanted reflection from the front face of the fibre is coupled back to the detector. After a two-way passage through the beam-splitter the reflected pulse reaching the optical detector typically contains 1% of the total intensity emitted by the laser diode. Typically 4% of the energy incident upon the fibre face is reflected. Each passage through the 3 dB beam-splitter reduces the beam intensity by 50%. In consequence, this signal saturates the detection circuitry which is intended to measure the back-scattered intensity at a level typically 40 dB below the front face reflection.

There have been a number of alternative techniques proposed to eliminate the disadvantages noted above but these have not been entirely successful. One attempt utilized a tapered fibre section input coupler but the practical implementation of this technique proved to be difficult and has now been discarded. Another attempt employed a pin-hole in a totally reflecting plate as an input coupling scheme but the approach placed stringent requirements on source alignment and focusing. One solution to the second problem set out above is to house the fibre end-face and beam-splitter in a carefully constructed cell containing index-matching fluid. This technique is relatively cumbersome. Another technique involves gating the detector by biasing its photomultiplier to an off state for the duration of the reflected place. Finally, another attempt has been to include a polarizer before the detector to eliminate unwanted reflection but this has a further 3 dB attenuation to the back-scattered intensity.

An alternative approach that may prove viable in the future is the use of a single semi-conductor junction transceiver that can act as a forward biased source for transmission and as a reverse biased detector for receiving. But practical studies of optical transceivers are at a very early stage and their present performance cannot match that of individual, separately optimized sources and detectors.

Another area where the coupling problem is significant is in the two-way transmission of signals along a single optical fibre. The most common realization of such systems with present technology is to have a first source at one end of the fibre and its associated detector at the other end of the fibre; and a second source at the other end of the fibre with its associated detector at the end where the first source is situated. At either end of the fibre a 3 dB beam-splitter is located and there are operable to direct light to and from the sources, detectors, and ends of the fibre.

There are at least two serious disadvantages inherent in this approach, the first being the optical coupling loss of 6 dB from the sources to their respective detectors. This corresponds to an electrical signal loss of 12 dB. Second, unwanted fibre front-face reflection from the first source is coupled to the second detector located at the same end of the fibre at an intensity level which is typically 1% of the total emission of the first source. Assuming that the optical fibre is of good quality with a loss of 2 dB per kilometer and that both sources are of equal intensity, then the unwanted reflection is of the same magnitude as the desired signal from the second source when the fibre length is only 7 kilometers (bearing in mind the inherent 6 dB optical loss from the second source to its associated detector). Of course, the same type of undesirable coupling occurs between the second source and the detector located at the same end of the fibre.

There have been some attempts to deal with this problem and such input coupling devices include the following. First, there have been attempts to provide Y-junction couplers but these have proven difficult to fabricate in multi-mode fibre form and frequently exhibit high insertion loss. Secondly, multi-mode fibre four-port directional couplers have been fabricated to achieve low insertion loss and high directionality. However, the manufacturing process is relatively tedious and manual alignment of the coupler to achieve optimum performance is required. The lack of a theoretical analysis of the device means that a given coupling ratio can be achieved only on a trial and error basis. A variety of directional couplers has been demonstrated in integrated optic form. However, the inherent single-mode nature of these devices means that they are compatible only with single-mode fibres. Finally, certain devices which can be referred to as non-reciprocal devices can be constructed and arranged so as to present a propagation direction-dependent transfer function to two identical but oppositely travelling light beams. However, these devices generally require that the optical signals be plane polarized and thus may find application only in single-mode fibre systems. They are not compatible with multi-mode optical fibres.

It is the object of the invention to provide a new fibre optic termination which is especially useful in optical time domain reflectometry and in two-way transmission of light signals along a single optical fibre. The use of the termination of the invention in these two areas at least partially overcomes the drawbacks of the prior art as noted above.

According to the present invention there is provided a termination for optical fibres comprising an optical fibre having a core of refractive index n', surrounded by cladding of refractive index $n_c$, the termination including a surface through which light is, in use, injected into the core of the fibre at an angle $\phi$ relative to a normal to said surface, the surface being arranged such that the longitudinal axis of the core is inclined at an angle $\alpha$ to said surface, and wherein $$90° - \phi_c' - \Theta_c' \leq \alpha \leq 90° - \phi' + \Theta_c'$$

where
$\phi_c' = \arcsin (n/n')$
$\Theta_c' = \arcsin (2\Delta n_m)^{\frac{1}{2}}$
$\phi' = \arcsin (\sin \phi)/n'$
$\Delta n_m = (n' - n_c)/n'$
and wherein $\arcsin [n' \sin (\phi_c' - 2\Theta_c')] \leq \phi \leq 90°$ The termination may be manufactured as a discrete component having a convenient length of optical fibre formed therewith which can be joined by known techniques to long optical fibres suitable for communications applications.

Alternatively, the termination may be formed integrally on a long guide by cutting the guide at the angle $\alpha$ to its longitudinal axis. One technique for cutting and polishing the fibre at the required angle would be to mould an end of the fibre in a body of glass or plastics material and then cut the body at such an angle that the cutting surface intersects the fibre and is at the required angle relative to the longitudinal axis of the fibre.

In a somewhat modified form of the invention the termination could be formed by moulding or mounting the end of the fibre in a body of glass or plastics material which body has a flat surface which makes an angle $\alpha$ relative to the longitudinal axis of the fibre, the body being of approximately the same refractive index as the core of the fibre so as to minimize internal reflection at the junction of the core with the body. In this arrangement the distance between the end of the fibre and said surface of the body should be less than about 5 millimeters but the exact distance is not critical to the invention.

The invention also includes a communications system comprising:
 a termination as defined above, means for producing an input beam which is arranged to be incident upon said surface at an angle $\phi$ and a light detector which is located adjacent to said termination and disposed such that light propagated along the fibre is reflected towards the detector at said surface.

Figure 2:
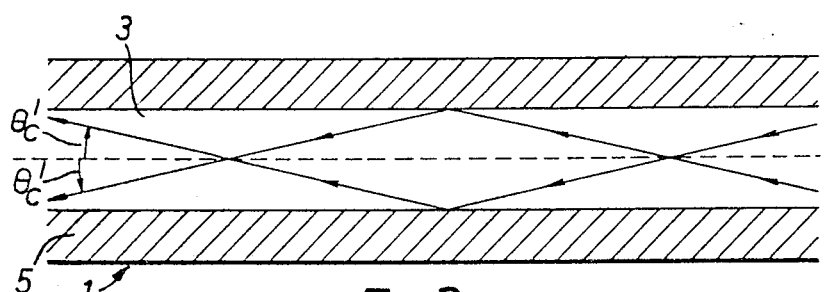
Figure 3:
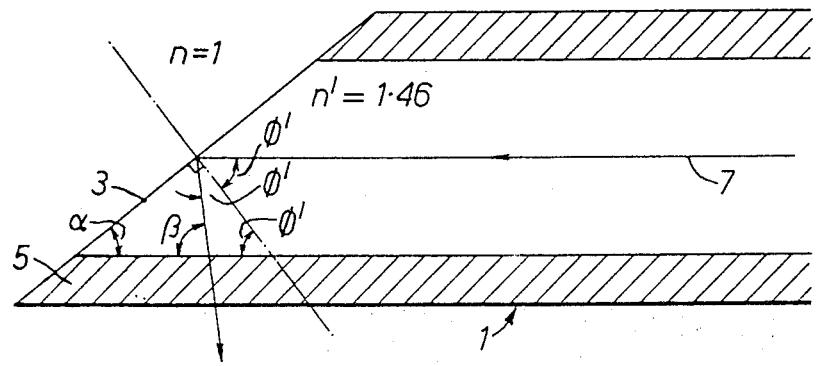
Figure 4:
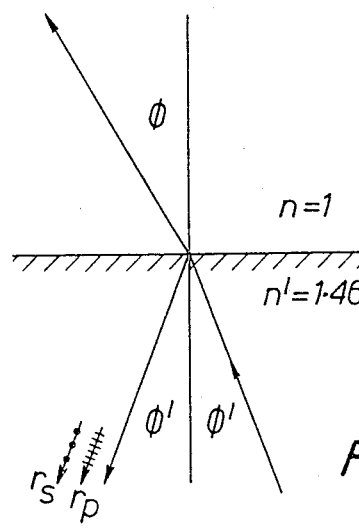
Figure 6:
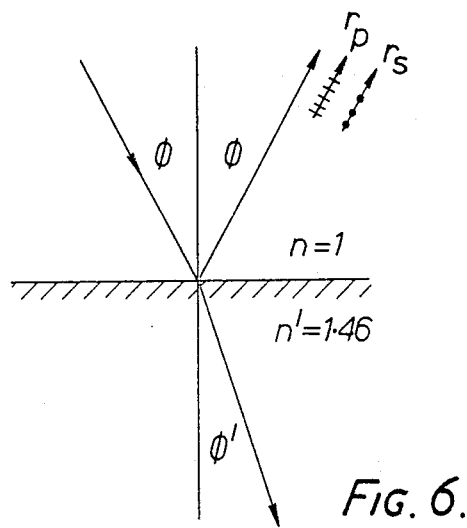
Figure 5:
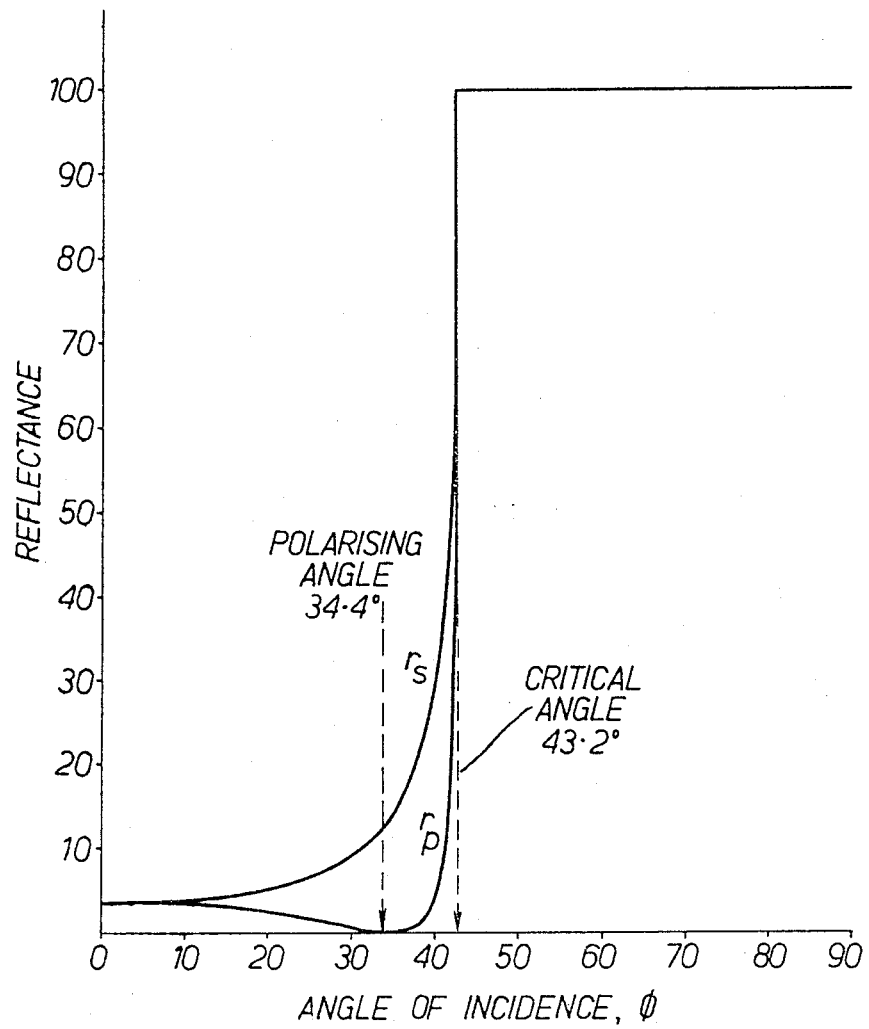
Figure 7:
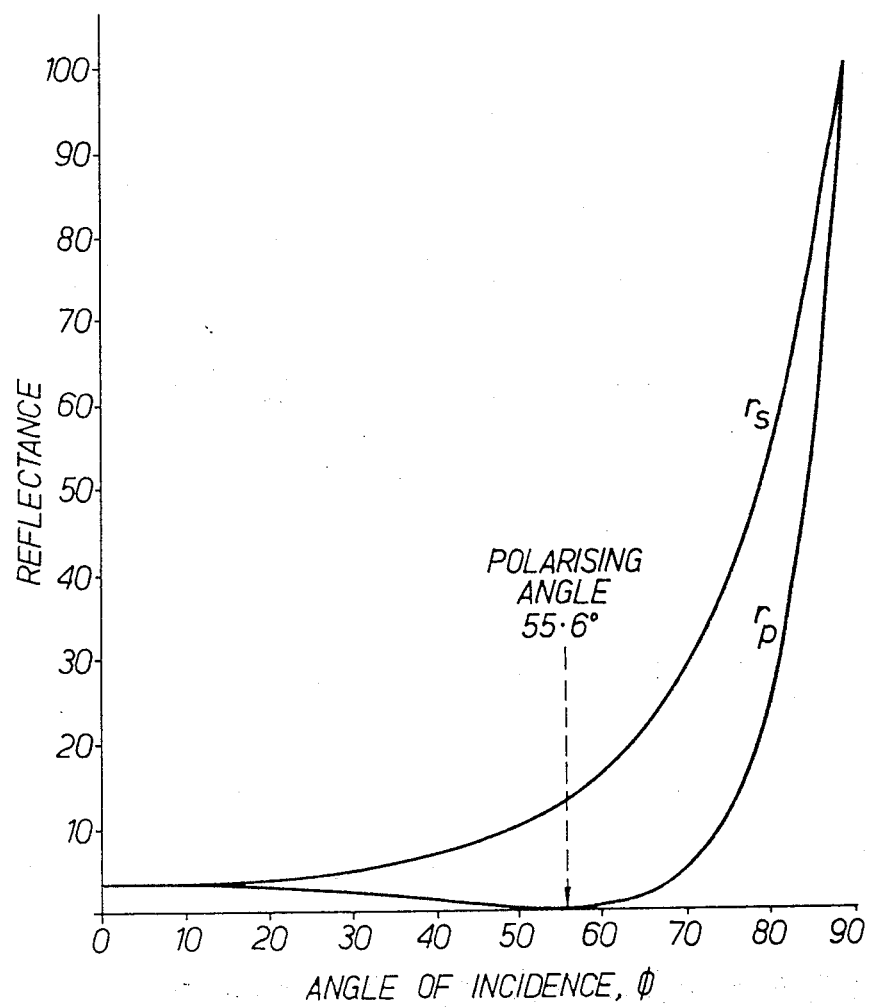
Figure 8:
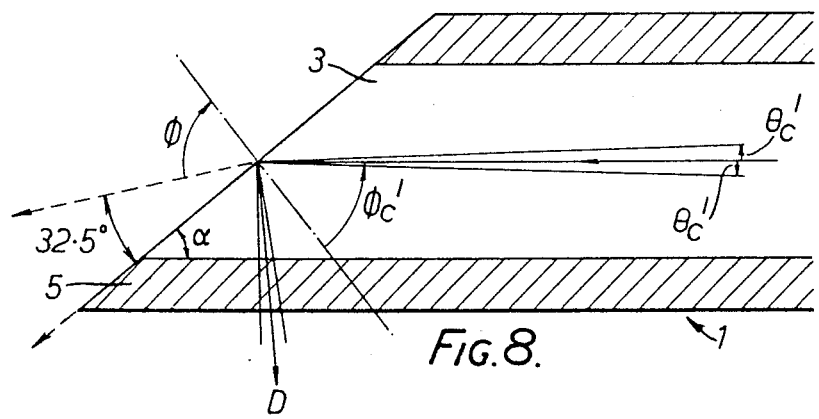
Figure 9:
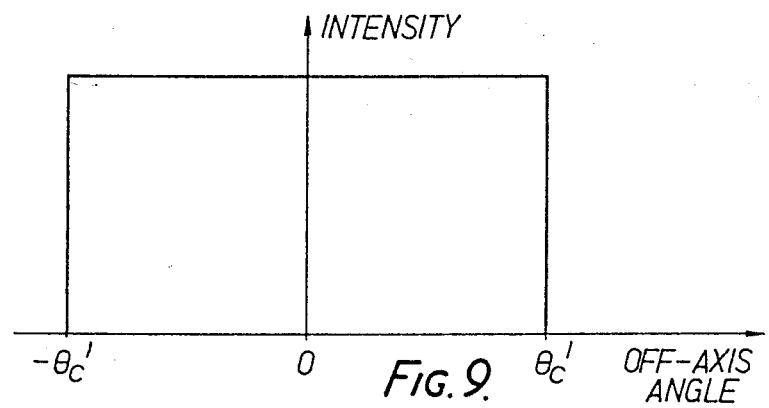
Figure 10:
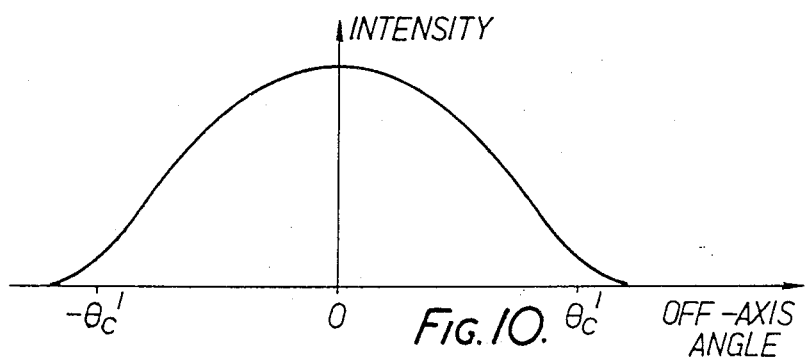
Figure 11:
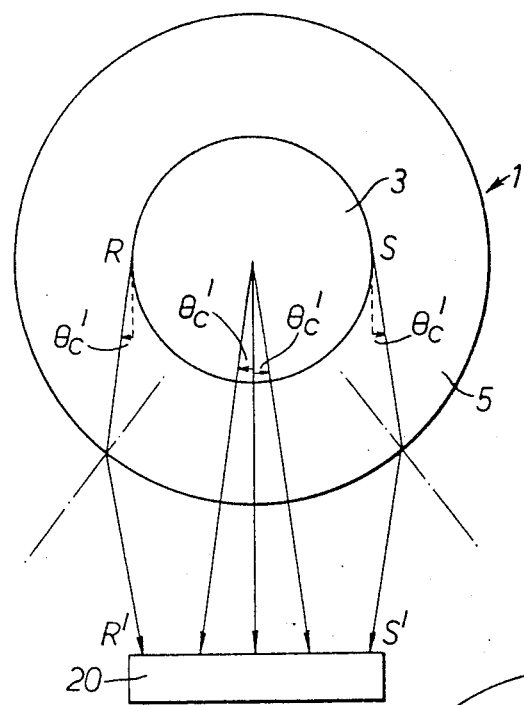
Figure 12:
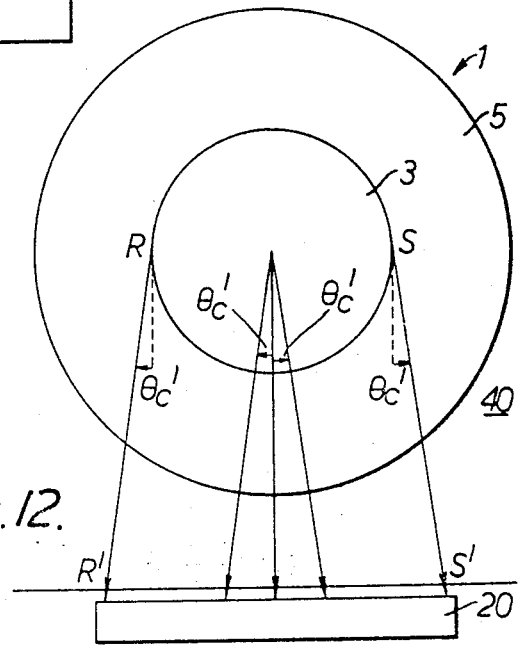
Figure 13:
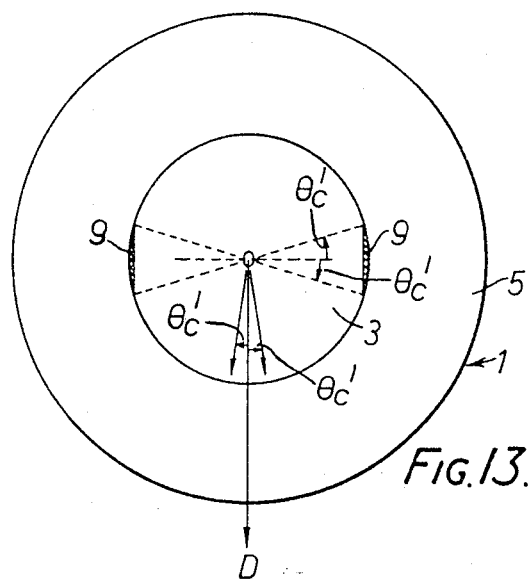
Figure 17:
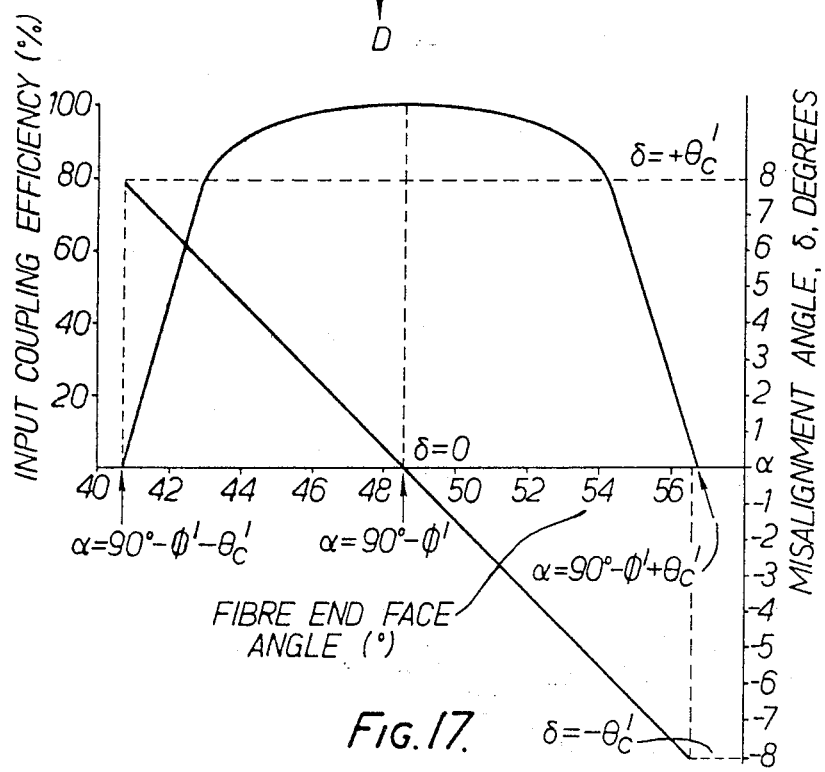
Figure 14:
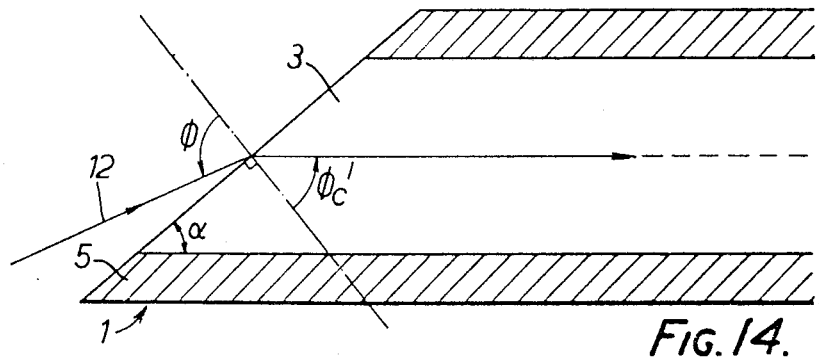
Figure 15:
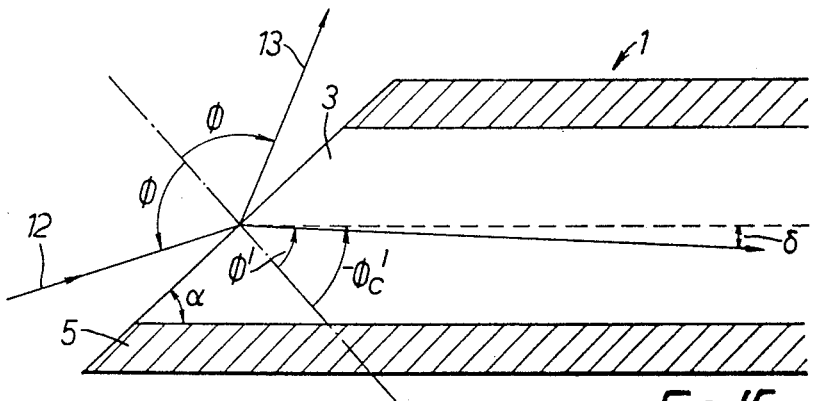
Figure 16:
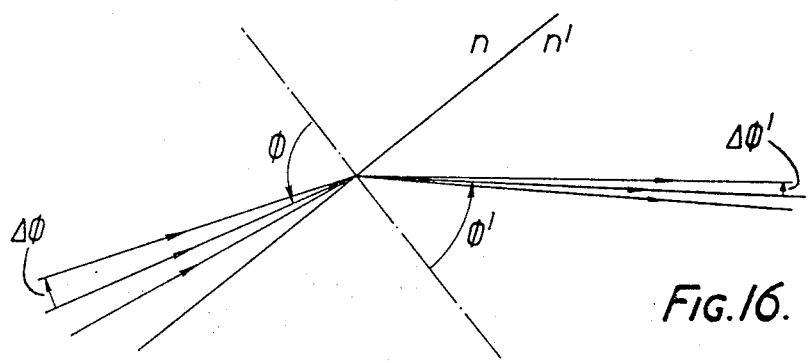
Figure 18:
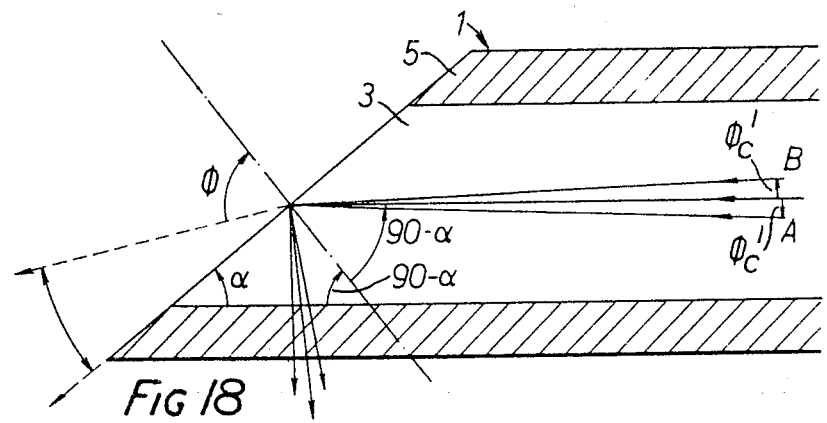
Figure 19:
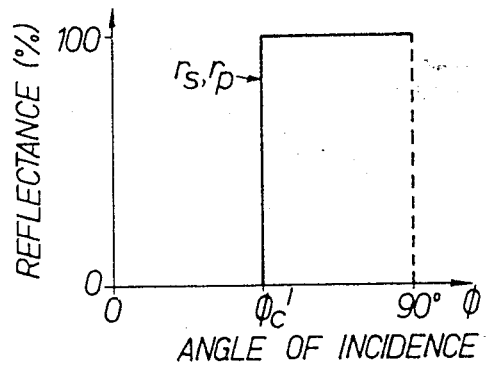
Figure 20:
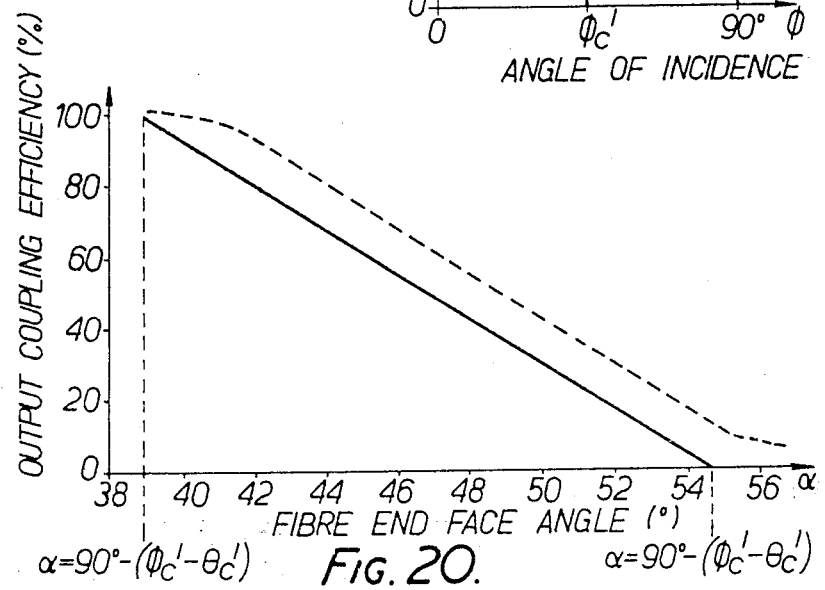
Figure 21:
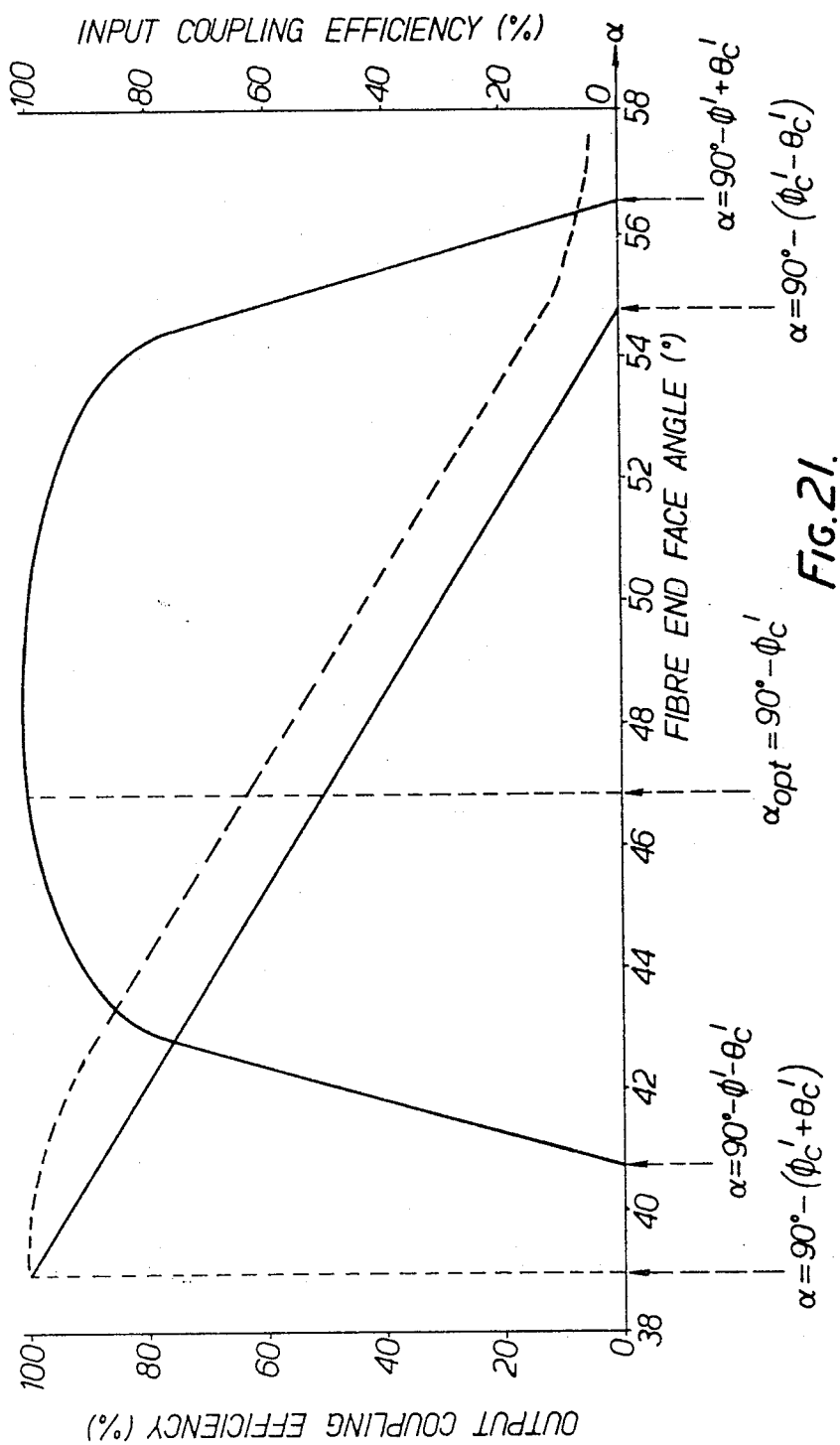
Figure 22:
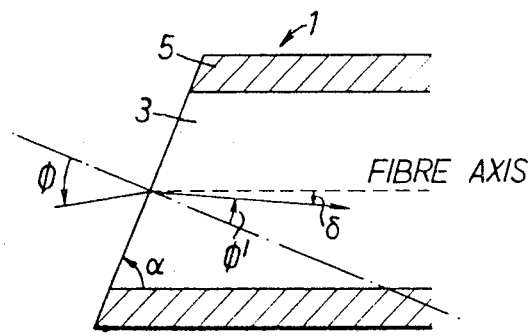
Figure 23:
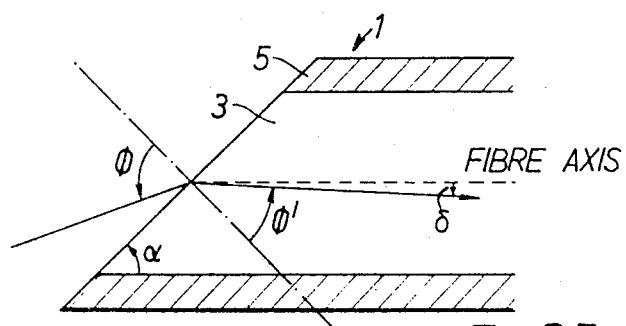
Figure 24:
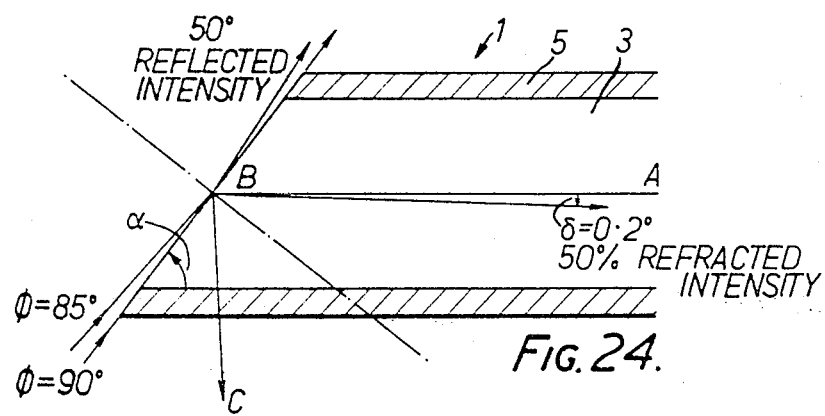
Figure 25:
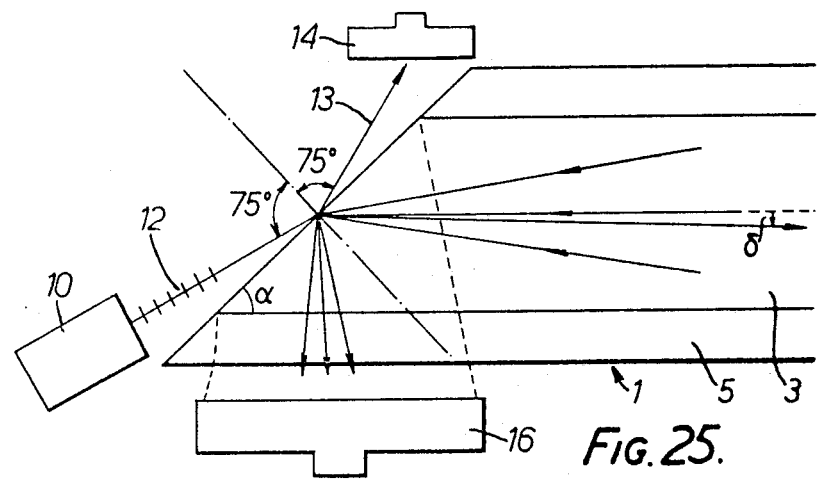
Figure 26:
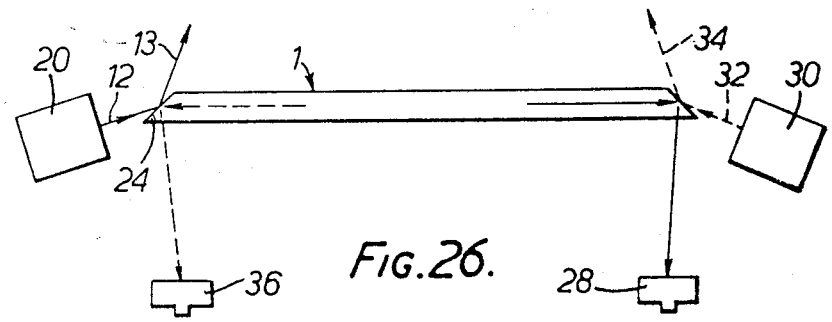
Figure 27:
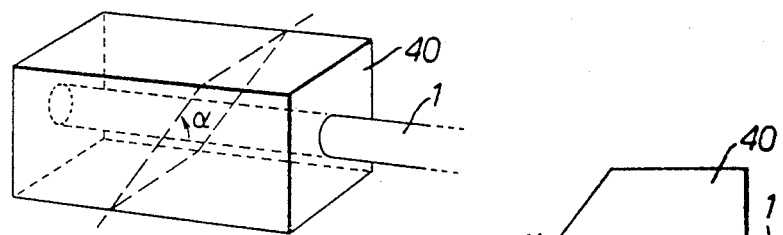
Figure 28:
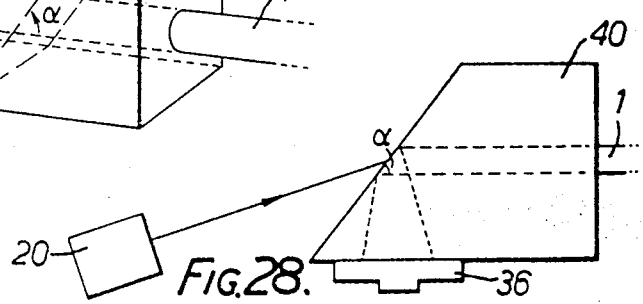

The nature of the invention will now be more fully described with reference to the accompanying drawings, in which:

FIG. 1 is a diagram which is useful in understanding the acceptance angle of an optical fibre, FIG. 2 is a diagram illustrating propagating waves in an ideal step index optical fibre, FIG. 3 illustrates total internal reflection of the axial ray in a termination of the invention, FIG. 4 is a schematic diagram illustrating internal reflection at a glass-air interface, FIG. 5 is a graph showing the reflectance of rays versus angle of incidence, FIG. 6 is a schematic diagram illustrating external reflection at a glass-air atmosphere, FIG. 7 is a graph showing the reflectance of rays versus angle of incidence, FIG. 8 illustrates reflection of propagating rays in a fibre, FIG. 9 illustrates ray intensity distribution in a perfect step index fibre, FIG. 10 illustrates a practical ray intensity distribution, FIG. 11 is a transverse section through a termination of the invention illustrating output ray paths for an unmounted fibre, FIG. 12 is a transverse section illustrating output ray paths for a mounted fibre termination, FIG. 13 is a transverse cross-section of a termination illustrating regions of partial output coupling, FIG. 14 illustrates desired input coupling to a termination in accordance with the invention, FIG. 15 is similar to FIG. 14 except that the refracted beam makes a small angle to the fibre axis, FIG. 16 diagramatically illustrates refraction of a divergent beam at an air-glass interface, FIG. 17 is a graph illustrating the input coupling efficiency as a function of the fibre end-face angle $\alpha$, FIG. 18 illustrates output coupling of propagating waves in a fibre with end-face angle $\alpha$, FIG. 19 illustrates simplified reflectances for internal reflection at a dielectric interface, FIG. 20 is a graph illustrating output coupling efficiency as a function of fibre end-face angle $\alpha$, FIG. 21 is a graph illustrating input and output coupling efficiencies as a function of fibre end-face angle $\alpha$, FIGS. 22 and 23 illustrate the dependence of the angle of incidence $\phi$ upon the fibre end-face angle $\alpha$, FIG. 24 illustrates total internal reflection of the axial ray in fibre, FIG. 25 schematically illustrates an arrangement for optical time domain reflectometry measurement using terminations in accordance with the invention, FIG. 26 illustrates schematically a two-way transmission along a single optical fibre in accordance with the invention, FIG. 27 illustrates one technique for producing a termination of the invention, and FIG. 28 illustrates a convenient mount for a detector.

The optical fibre terminations and new coupling techniques of the invention will be described by way of specific example but it will be appreciated that the same techniques can be applied to any practical optical fibres. Consider an optical fibre 1 having a core 3 and cladding 5 of the following specification:

Fibre type: step index, multi-mode
Material: silica glass
Numerical aperture (N.a.) = 0.20
Core material refractive index (n') = 1.46
Core diameter 50 to 100 $\mu$m The fibre core diameter is only of indirect importance in this matter and accordingly the range noted above should not be regarded as exhaustive. Fibres of the above specifications are typical of those used in telecommunications systems.

The numerical aperture of an optical fibre can be defined, with the aid of FIG. 1 as $$NA = \sin \theta_c = \frac{1}{n} [(n')^2 - (n_c)^2]^{\frac{1}{2}} \qquad (1)$$

Here $n'$ is the (maximum) core refractive index, $n_c$ is the cladding refractive index and $n$ is the refractive index of the surrounding medium (usually air so that $n=1$). $\theta_c$ has the physical interpretation that it is the maximum angle, measured in air, at which an off-axis ray incident upon the core region at a flat (normal) fibre end-face will undergo total internal reflection at the core-cladding interface and thus will be guided along the fibre. Hence, $\Theta_c$ is given the name "acceptance angle". The corresponding angle measured in the core material is determined by Snell's law to be $$\theta'_c = \arcsin \left( \frac{\sin \theta_c}{n'} \right) \qquad (2)$$
$$= \arcsin (NA/n')$$

which is the result expressed in equation (1).

The maximum relative core-cladding refractive index difference is $$\Delta n_m = (n' - n_c)/n' \qquad (3)$$

which is usually small for practical fibres ($<2\%$). Equations (1) and (3) can be used to show that $$NA \doteq n'(2\Delta n_m)^{\frac{1}{2}} \qquad (4)$$

Then equation (2) produces the result $$\theta'_c = \arcsin (2\Delta n_m)^{\frac{1}{2}} \qquad (5)$$

For a fibre of N.A.=0.20, the light rays propagating within the fibre are contained within a cone of semi-angle $$\theta'_c = \arcsin [NA/n'] \qquad (6)$$
$$= 7.9°$$

Equation (1) is a statement of the requirement that the guided light rays must be propagating at a sufficiently shallow angle to the core-cladding interface to undergo total internal reflection. The convention that a "primed" symbol denotes a parameter measured within the fibre core, is used throughout. This cone of propagating rays is sketched in FIG. 2.

In accordance with the invention the endface of the fibre is cut at a precisely defined angle $\alpha$ relative to the central axis of the fibre.

In such an arrangement FIG. 3 illustrates the case where the axial ray 7 (i.e. the ray travelling directly along the fibre axis without contacting the core-cladding interface) just undergoes total internal reflection at the air-glass interface. This requires that the axial ray make an angle of incidence, $\phi'$, with the fibre end face, that equals the critical angle, $\phi_c'$, for the silica-air interface. Hence $$\phi' = \phi_c' = \arcsin (n/n') \qquad (7)$$

Substituting numerical values for our specific example yields $\phi_c' = 43.2°$. From the geometry of FIG. 3, it can be seen that the fibre end-face must be cut an an angle $$\alpha = 90° - \phi_c' \qquad (8)$$

which, for the example, is $\alpha = 46.8°$. Note also that the axial ray is reflected at an angle $$\beta = 2\phi_c' \qquad (9)$$

to the core cladding interface, which in the numerical example is $\beta = 86.4°$.

FIG. 4 is a simple diagram illustrating internal reflection at an air-glass interface and FIG. 5 is a graph showing the relative reflected intensity versus the angle of incidence.

FIG. 6 and FIG. 7 are corresponding figures for external reflection. In these diagrams the reflectance of the component whose plane of polarization is parallel to the plane of incidence, defined by the input beam and the surface normal is denoted by $r_p$. The reflectance of the component whose plane of polarization is normal to the plane of incidence is denoted by $r_s$.

From these curves it is clear that all the propagating rays of the fibre that make an angle of incidence $\phi' \geq \phi_c'$ with the silica glass-air interface will be totally internally reflected and can be monitored by a detector, D. FIG. 8 shows that these totally reflected rays lie in the upper semi-angle of the cone of propagating rays in the fibre. The rays in the lower semi-angle are partially reflected, the reflectance of each ray being determined from the Fresnel curves presented in FIG. 5.

In any particular situation, the total fraction of incident optical energy reflected can be calculated by integrating the Fresnel reflectance curves with respect to the mode intensity distribution, supported by the fibre. It is apparent, from the preceding discussion, that the reflected intensity measured at D, adjacent to the fibre, near the point formed by cutting at angle $\alpha$, must, in all practical cases, be less than 3 dB below the total incident intensity in the fibre. For the simplest case of a step-index fibre carrying an unpolarised beam of uniform ray intensity distribution, as represented in FIG. 9, the total energy reflected has been estimated as 2.1 dB below the total incident energy in the fibre. This estimation was undertaken by approximating the area beneath the Fresnel curves.

In most practical situations, the incident light will have propagated some considerable distance along the fibre from a distant source. The greater attenuation of the higher angle rays produces a collimating effect on the intensity distribution of the propagating rays. Thus the intensity distribution is likely to be described by a functional variation similar to that indicated in FIG. 10. An examination of FIGS. 5 and 10 shows that the net effect of this modified intensity distribution is that in practical situations the output coupling loss, due to rays not undergoing total internal reflection, is less than 2.1 dB.

Rays that are not totally internally reflected are partially refracted out of the fibre, as illustrated in FIG. 8.

These refracted rays lie within the cone defined by the extreme angles $$\phi_{max} = \arcsin(n' \sin \phi'_c)$$
$$= 90°$$

and $$\phi_{min} = \arcsin[n' \sin(\phi'_c - \theta'_c)]$$

which, in the present example is $\phi_{min} = 57.5°$. Note that $\phi_{max}$ and $\phi_{min}$ have been calculated by applying Snell's Law of Refraction to the extreme propagating rays of the fibre in the partially reflected semiangle of FIG. 8. Note also that the unreflected light is refracted over a large angular spread of 32.5°.

In summary, the technique of the invention of cutting the fibre end-face at a predetermined angle allows light to be coupled out of the fibre, in a transverse direction, with a coupling loss of less that 2.1 dB.

As established in equation (9) and indicated in FIG. 3 the rays coupled out of the fibre propagate at an angle $\beta$, that is very nearly 90°, to the fibre axis. Hence the fibre cross-section in the plane of propagation of these rays is slightly elliptical. But for the purpose of this discussion an assumption of a circular fibre cross-section, in this plane, is valid.

The main feature of interest is the angular spread of the output rays. The two extreme rays are labelled RR' and SS' in FIG. 11. If the fibre is unmounted the curved cladding-air interface tends to focus the output rays. FIG. 11 and the orthogonal view, FIG. 3, show that the total output coupled intensity can be measured by a small detector. Provided the detector is placed sufficiently close to the fibre, the diameter of the active area need be only slightly greater than the fibre core diameter—typically 50-100 μm. FIG. 12 illustrates the case of a fibre mounted in a block 40 of index matching material, as discussed later with reference to FIGS. 27 and 28. Because there is no refraction at the core-cladding boundary, the rays RR' and SS' continue to diverge. However the active area diameter of the detector still need be only slightly larger than the fibre core diameter. It is worth noting that even the smallest commercially available detectors are adequate for this purpose:—e.g.

(1) United Detector Technology
   UDT 020-A Silicon PIN photodiode
   Active area diameter 500 μm
(2) Texas Instruments
   TIXL 55 Silicon avalanche photodiode
   Active area diameter 260 μm One final observation concerning output coupling can be made. There are two extremely small areas of the fibre cross-section that define regions of only partial output coupling. (The word "partial" is used here to imply that a ray qualifying for total internal reflection by the one dimensional case considered earlier may be not so reflected when the process is viewed in the transverse dimension.) These areas 9 are cross hatched in FIG. 13. Some of the totally internally reflected rays traversing these cross hatched regions are incident upon the core-cladding interface at very shallow angles, and are thus again totally internally reflected. Therefore they cannot escape from the fibre core.

The extent of these areas 9 can be defined as follows. Recall that the propagating rays in the fibre lie within a cone of semi-angle $\pm\theta'_c$ centred upon the fibre axis. After total internal reflection at the prepared fibre end face, the rays lie within a cone of half-angle $\pm\theta'_c$ centred upon the direction of propagation of the reflected axial ray—this direction is labelled OD in FIG. 13. For a ray to escape from the fibre core it must be incident at an angle $\phi' < (90° - \theta'_c)$ to the tangent of the core-cladding interface at the point of incidence. When this tangent makes an angle of $<2\theta'_c$ with OD there will be less than 100% output coupling, of the totally internally reflected rays, from the core into the cladding.

Due to the symmetry of the ray distribution about OD, the output coupling from rays traversing the areas 9 still must be greater than 3 dB. Obviously the areas 9 occupy a very small fraction of the total fibre core area. These two factors ensure that the fraction of totally internally reflected intensity that cannot escape the fibre core is negligible. This is true for step index fibres which have an approximately uniform intensity distribution over the fibre core. It is even more true of graded index fibres, where the light intensity distribution over the fibre cross-section closely resembles the refractive index profile and hence there is very little light propagating near the core-cladding interface.

Considerations involved in efficient input coupling of light to the end-face of a fibre which has been cut at an angle α will now be described with particular reference to FIG. 14, where a beam 12 of light is incident at an angle $\phi$ upon the silica glass-air interface, from the air. Ideally this angle of incidence should be such that the reflected ray is directed along the fibre axis. This requires, from Snell's law, $$\phi = \arcsin(n' \sin \phi'_c)$$
$$= 90°$$

FIG. 7 is a plot of reflectance versus angle of incidence for the case of external reflection at a silica glass-air interface. These curves reveal that, for $\phi = 90°$, the incident beam is totally reflected. This is completely consistent because, in FIG. 11 it corresponds to the case where an attempt is made to couple into a refracted ray with $\phi' = \phi'_c$, which is the condition for total internal reflection of the ray travelling in the opposite direction along the fibre axis.

The above discussion discloses that it is impossible to couple an incident light beam along the fibre axis, but practical approximations to this ideal launching condition will be discussed.

Obviously, the angle of incidence, $\phi$, must be as close to 90° as practical. From FIG. 7, when $\phi = 75°$ the reflectances for the two polarizations of an incident beam are $$r_p = 10.9\% \text{ and } r_s = 38.1\%$$

A p-type plane polarised input beam, incident at $\phi = 75°$, produces a 0.5 dB reflection loss, while an s-type plane polarised beam has a 2.1 dB reflection loss. For an unpolarised beam the reflectance is $[(10.9 + 38.1)/2]$ or 24.5%, corresponding to a 1.2 dB loss.

If the angle of incidence is chosen to be $\phi = 75°$, misalignment between the refracted beam and the fibre axis is calculated below with reference to FIG. 15.

Again, from Snell's law, the refracted beam makes an angle $$\phi' = \arc \sin [(1/n), \sin \phi] \quad (10)$$

with the surface normal. Substituting $n' = 1.46$ and $\phi = 75°$ determines that $\phi' = 41.4°$. As shown in FIG. 15, the misalignment angle is $$\delta = \phi_c' - \phi'$$

which provides $\delta = 1.8°$. Hence the light is coupled into the fibre slightly off-axis, but well within the acceptance angle of the fibre which is $\Theta_c' = \pm 7.9°$ either side of the axis. Furthermore, the process of mode-mixing will quickly establish the usual (i.e. for on-axis excitation) ray intensity distribution after a short propagation distance along the fibre without loss.

It is to be expected, particularly in the case of a well-collimated source, that the degradation of input coupling efficiency due to this small misalignment (c.f. the coupling efficiency achievable with a fibre end-face that is normal to the fibre axis and on-axis excitation) is quite small. Crude measurements have been taken in the laboratory to confirm this. A step index fibre of the type considered here was excited with a focused helium-neon laser beam. The focusing element was a 5× microscope objective, producing an input beam of divergence $\pm 1°$ and thus approximating axial launching conditions. This source and the fibre were carefully aligned to produce the maximum power coupled into the fibre and monitored at the fibre output. The fibre was then misaligned by angles up to 3°: a misalignment of 3° in air corresponds to a 2° off-axis excitation in the fibre. Unfortunately the precision of the mechanical translation stages was inadequate, and the fibre had to be repositioned to optimise coupling. But within experimental error, the fibre output intensity was the same as for on-axis excitation.

The effect of increasing the angle of incidence can be assessed from equation (9) and the curves of FIG. 7. As $\phi$ is increased from 75°, the misalignment angle $\delta$ is reduced ($\delta$ approaching 0° for $\phi$ approaching 90°) but there is a dramatic increase in the reflectances $r_s$ and, in particular, $r_p$. For the present example, $\phi = 75°$ offers a reasonable compromise between misalignment angle and reflection loss.

Finally, note from FIG. 15, that the reflected beam 13 is directed away from both the source and the detector position D (as shown in FIG. 8).

The problem of coupling light into the fibre has been discussed assuming an ideal collimated source. Obviously the solution proposed is a valid approach for well-collimated input beams such as are emitted by gas lasers and solid state crystal lasers. The question arises as to whether the proposed solution to the coupling problem can be effective when the source exhibits a moderate divergence. FIG. 16 illustrates this situation.

Here $\Delta\phi$ and $\Delta\phi'$ are the semi-angles of the input and refracted light beams respectively. From Snell's law, $$n \sin \phi = n' \sin \phi' \quad (11)$$

and $$n \sin (\phi + \Delta\phi) = n' \sin (\phi' + \Delta\phi') \quad (12)$$

For small $\Delta\phi$, the expansion $$\sin (\phi + \Delta\phi) \div \sin \phi + \Delta\phi \cos \phi$$

can be applied to both sides of equation (12). Equation (11) allows the result to be written as $$\frac{\Delta\phi}{\Delta\phi'} = \left[\frac{n'}{n}\right] \cdot \left[\frac{\cos \phi'}{\cos \phi}\right] \quad (13)$$

Term 1   Term 2

In this expression, both Term 1 and Term 2 are >1, for the present example of refraction from a low refractive index medium into a high refractive index medium. Thus both terms contribute to the fact that the refracted beam has a higher degree of collimation than the incident beam. Term 1 describes the collimation effect due solely to the refractive index discontinuity and represents that degree of collimation that occurs for a normally incident beam. Term 2, which is a monotonically increasing function of $\phi$, describes the collimation effect due solely to the angle of incidence.

For the particular example under consideration, substitute
$n = 1$,
$n' = 1.46$,
$\phi = 75°$, and
$\phi' = 41.4°$
to determine that $$\Delta\phi/\Delta\phi' = 4.2$$

The divergence of the input beam is reduced by a factor of 4.2 when coupled into the fibre by the method shown in FIG. 15. This is an improvement of a factor of 3 over the collimation available with normal incidence excitation.

Considering now the overall coupling performance of the termination which is cut at a precise angle $\alpha$, it will be noted from the above that light can be coupled out of the fibre in a transverse direction by the process of total internal reflection with a loss of less than 2.1 dB, in the given example. Also it will be apparent that for a plane-polarised source at an incident angle of 75°, the input coupling loss at the same fibre end-face is 0.5 dB.

Four general comments can be made upon the termination as follows.

(1) The particular example used in the preceding discussion was a step index fibre. The technique is equally suitable for graded index fibres and would result in comparable input and output coupling efficiencies.

(2) The same example assumed a core material refractive index of 1.46 (pure silica), and produced a calculated angle of $\alpha = 46.8°$ at which to cut the fibre end-face. Most practical glasses and plastics used as the core materials of optical fibres have refractive indices within the range 1.46 to 1.50. The higher the core material index, the larger is the value of $\alpha$ required. For comparison purposes, the significant parameters of the design exercise are tabulated below for two fibres of the same NA, but of core refractive indices 1.46 and 1.50

| | | |
|---|---|---|
| Core Material Refractive Index, n' | 1.46 | 1.50 |
| Numerical Aperture, N.A. | 0.20 | 0.20 |
| Fibre Acceptance Angle $\theta'_c$ (in core material) | 7.9° | 7.7° |
| Critical Angle for Total Internal Reflection, $\phi'_c$ | 43.2° | 41.8° |
| Angle of Cut Fibre End-face, $\alpha$ | 46.8° | 48.2° |
| Chosen angle of incidence, $\phi$ | 75° | 75° |
| Reflectance, $r_p$ | 10.9% | 10.7% |

| -continued | | |
|---|---|---|
| Misalignment Angle of Input Beam, δ | 1.8° | 1.7° |

As the core refractive index increases, so the angle $\alpha$ at which the fibre end-face must be cut also increases. Note that it is *not* possible to cut all fibres at some general angle, say $\alpha = 45°$, and still achieve the input and output coupling performance as described above. For example, suppose the end-face of the fibre of core index $n' = 1.50$ is cut at $\alpha = 45°$ instead of the design value of 48.2°. The first effect is that more of the rays in the fibre will undergo total internal reflection, and hence the output coupling loss will be reduced. The second effect is that the misalignment angle, for an incident beam at $\phi = 75°$, is increased to 4.9° from the "optimum" of 1.7°. It is not possible to significantly reduce this misalignment by increasing the angle of incidence beyond 75°. The misalignment is too large to expect that mode mixing can redistribute the ray intensity distribution without incurring additional coupling loss. This statement is true even of the fibres with comparatively large NA = 0.20 considered here, but is even more significant with fibres of NA = 0.15 and $n' = 1.5$, say, where the acceptance angle is reduced to $\Theta_c' = 5.7°$.

(3) The discussion under point (2) above indicates that it is possible to trade input coupling efficiency and output coupling efficiency by varying the angle at which the fibre is cut. Two situations arise.

- (i) Where <3 dB output coupling required: The fibre is cut an an angle, $\alpha$, greater than that calculated from equations (7) and (8). This reduces the output coupling efficiency and marginally improves the input coupling efficiency by lessening the misalignment angle for a fixed angle of incidence. A quantitative design procedure could be formulated to describe the various coupling ratios obtainable by this procedure.
- (ii) Where >3 dB output coupling required: The fibre is cut at an angle, $\alpha$, less than that calculated from equations (7) and (8). Output coupling efficiency is thus improved. For a fixed angle of incidence, the misalignment angle is increased. Maintaining efficient input coupling then relies upon effective mode-mixing in the fibre. The difficulty in quantifying the effects of mode-mixing for a typical situation makes a quantitative design analysis more difficult in this situation.

(4) For best performance of the terminations of the invention the source should be well-collimated and plane-polarised. These requirements are readily fulfilled by most conventional laser sources, e.g., gas and solid state crystal lasers. However the input coupling technique seems viable with semiconductor laser diode sources also. Present commercially available laser diodes designed for optical fibre communications e.g., LCW-10 manufactured by Laser Diode Laboratories are basically single transverse mode devices, at least up to moderate drive current levels and thereby the output beam can be plane-polarised. The next generation of commercially available laser diodes should be truly single transverse mode devices. The far-field radiation pattern of such a laser diode typically spreads ±2° in the plane parallel to the junction, and ±27° in the plane normal to the junction. Clearly it is the latter divergence that creates coupling problems. Published reports have demonstrated how a carefully selected fibre can act as a cylindrical lens to reduce this divergence approximately six-fold to ±4°. When combined with the four-fold collimation available with the proposed coupling scheme, the divergence is reduced to the order of ±1°. Thus efficient input coupling of a laser diode source seems assured.

Turning now in more detail to considerations involved in input/output coupling efficiencies as a function of fibre end-face $\alpha$, it will become apparent that useful ranges of the end-face angle $\alpha$ cannot be expressed without reference to the input light beam angle of incidence $\phi$. Nevertheless, the inner qualities are developed below to demonstrate important parameters.

In the foregoing description there is a brief qualitative description of the effects on input and output coupling efficiencies of varying the end-face angle $\alpha$ from the so-called "optimum" value namely $$\alpha_{opt} = 90° - \phi_c' \tag{14}$$

where $\phi_c'$ is defined in equation (9).

This description is expanded below in an attempt to establish the limiting values of $\alpha$ over which input and output coupling can be achieved.

First, with regard to input coupling it will be recalled from FIG. 15 that a ray incident at an angle, $\phi$, upon the prepared fibre end-face is misaligned from the fibre axis, by a small angle, $\delta$. Assuming that the source is collimated and that the angle of incidence, $\phi$, is fixed, the misalignment angle is $$\delta = (90° - \alpha) - \phi' \tag{15}$$

where, by Snell's law of refraction, $$\phi' = \arcsin(\sin\phi)/n' \tag{16}$$

Obviously, when $|\delta| > |\Theta_c'|$ the beam is incident upon the core-cladding interface at too large an angle for total internal reflection to occur. This means that guiding of the light beam cannot take place and the input coupling efficiency to the fibre becomes zero. The conditions for non-zero input coupling efficiency are that $$-\Theta_c' \leq \delta \leq \Theta_c' \tag{17}$$

With the aid of equation (15) this inequality can be rearranged in the form $$90° - \phi' - \Theta_c' \leq \alpha \leq 90° - \phi' + \Theta_c' \tag{18}$$

This expression states that finite (non-zero) input coupling efficiency can be achieved over a range of $\alpha$ that extends over $2\Theta_c'$. Such a result is to be expected when it is recalled from FIG. 7 that $\Theta_c'$ is the (semi) acceptance angle for light measured in the core material. Note, from equations (5), (16) and (18) that the limiting range of $\alpha$ over which input coupling can be obtained is determined by the fibre core material refractive index and the relative core-cladding refractive index difference. Equation (15) indicates that $$\alpha = 90° - \phi' \tag{19}$$

is the condition for optimum input coupling, i.e. $\delta = 0$.

For the specific example described earlier the extreme limits of $\alpha$, determined by the inequality (18) are $$40.7° \leq \alpha \leq 56.5°$$

and $\delta=0$ requires that $\alpha=48.6°$. FIG. 17 illustrates the variation of input coupling efficiency with fibre end-face angle, $\alpha$. The only points on this curve that are known precisely are the maximum and the two zero coupling conditions. Thus the shape of the curve is a representation only, based largely upon an intuitive understanding. An accurate plot of misalignment angle, $\delta$, as a function of fibre end-face angle, $\alpha$, is also contained in FIG. 17.

Output coupling considerations will now be discussed in greater detail with reference to FIG. 18, which is similar to FIG. 3 which illustrates the output coupling situation for a fibre with the end-face cut at a general angle, $\alpha$. From FIG. 18 it can be deduced that the angles of incidence, $\phi'$, of the various rays are $\phi' = (90° - \alpha)$ for the axial ray,
$\phi' = (90° - \alpha - \Theta_c')$ for extreme ray A, and
$\phi' = (90° - \alpha + \Theta_c')$ for extreme ray B.

For a ray to be totally internally reflected, $$\phi' \geq \phi_c'$$

where $\phi_c'$ is defined in equation (7).

There are two cases that are of particular interest. The first is when extreme ray A just satisfies the conditions for total internal reflection. In this case $$90° - \alpha - \Theta_c' = \phi_c'$$

i.e. $\alpha = 90° - (\phi_c' + \Theta_c')$      (20)

and all other propagating rays within the fibre are also totally internally reflected. The output coupling efficiency is therefore 100%. For the specific example discussed earlier the above condition becomes $\alpha = 38.9°$.

The second case of interest arises when extreme ray B just fails to be totally internally reflected. This occurs when $$90° - \alpha + \Theta_c' = \phi_c'$$

i.e. $\alpha = 90° - (\phi_c' - \Theta_c')$      (21)

and none of the propagating rays within the fibre are totally internally reflected. The output coupling efficiency is therefore zero. For this specific example this condition arises when $\alpha = 54.7°$.

It is convenient, initially, to assume a simplified form of the Fresnel coefficients for internal reflection as plotted in FIG. 5. The assumption is that the reflectances $r_p$ and $r_s$, (for both polarizations of the incident light), are 100% for rays with $\phi' > \phi_c'$ and are zero for rays with $\phi' < \phi_c'$. This situation is illustrated in FIG. 19, and leads to the conclusion that 3 dB (50%) output coupling, of the total intensity carried by the propagating rays within the fibre, is obtained when $$\alpha = \alpha_{opt} = 90° - \phi_c'.$$

For the particular example this corresponds to $\alpha = 46.8°$.

The variation in output coupling efficiency with fibre end-face angle, $\alpha$, is shown in FIG. 20. The solid-line graph is a calculated result, using the simplified Fresnel reflectances as illustrated in FIG. 19. The dashed curve is an indication of the result that would be obtained by using the exact Fresnel reflectances of FIG. 5. Note, from equations (20) and (21) or from FIG. 20 that useful variation of the output coupling efficiency can be acieved over a range of $\alpha$ that extends over $2\Theta_c'$.

Turning now to a more detailed consideration of efficient input and output coupling, a key feature of the termination of the invention is its bi-directionality i.e., its ability to provide simultaneously efficient input and output coupling of light at a single fibre end-face. This requires a compromise choice of operating condition; one that provides adequate input and output coupling, simultaneously, but that is sub-optimum for either input or output coupling efficiency when these are viewed individually. An illustration of this point is presented graphically in FIG. 21, which is a superposition of FIG. 17, showing input coupling, and FIG. 20, showing output coupling.

As noted previously, the range of $\alpha$ over which input coupling can be achieved extends over $2\Theta_c'$. The range of $\alpha$ over which output coupling can be achieved is also $2\Theta_c'$. Although these two ranges of $\alpha$ for input and output coupling overlap to a large extent, they are not coincident. This is evident from FIG. 21. As $\alpha$ is varied over these ranges, an improved output coupling efficiency can be obtained at the expense of a reduced input coupling efficiency and vice versa.

The approximate useful limits of $\alpha$ can be stated as follows.

$$90° - (\phi_c' + \theta_c') \leq \alpha \leq 90° - \phi' + \theta_c' \quad (22)$$

100% output coupling efficiency     essentially zero output coupling efficiency
zero input coupling efficiency     zero input coupling efficiency Maximum (100%) input coupling efficiency occurs approximately mid-range when $\alpha = 90° - \phi_c'$ In the above inequality, the various angles are defined by previous equations (7), (5) and (16) to be:

$\phi_c' = \arcsin(n/n')$ ($n = 1$ for air, generally).

$\theta_c' = \arcsin(2\Delta n_m)^{\frac{1}{2}}$ and $$\phi' = \arcsin\left(\frac{\sin \phi}{n'}\right)$$

From these expressions, and the inequality (22) it is clear that the extreme limits of fibre end-face angle, $\alpha$, over which some level of input and/or output coupling can be achieved are fixed by (i) the core material refractive index, $n'$,
(ii) the relative core-cladding refractive index difference, $\Delta n_m$, and
(iii) the chosen angle of incidence, $\phi$.

Finally, note that the so-called "optimum" value of $\alpha$ as described earlier, namely $$\alpha_{opt} = 90° - \phi_c'$$

is also indicated in FIG. 21. This value of $\alpha$ was selected as "optimum" in that it provided an output coupling efficiency of 62% (<2.1 dB loss) and an input coupling efficiency that approaches 100%.

Turning now to the question of setting limits upon the useful angles of incidence $\phi$, it is noted from the above that in order to determine the useful limits of the fibre angle, $\alpha$, it is necessary to have selected the angle of incidence, $\phi$, of the input beam. The following discussion is concerned with establishing useful limits for $\phi$. First, the upper limit will be considered.

For a fibre end-face cut at the "optimum" angle $$\alpha_{opt} = 90° - \phi_c'$$

the misalignment angle, $\delta$, of an input beam from the fibre axis, approaches zero as $\phi$ approaches 90°. But as $\phi$ approaches 90°, the reflectances $r_s$ and $r_p$ for the two possible polarizations of the input beam approach 100%, and no light is coupled into the fibre, as described previously with reference to FIG. 7. Hence $\phi < 90°$ must be chosen.

Second, the lower limit for $\phi$ will be discussed, and in this respect in order to keep $\delta$ small, $\phi$ must be chosen to be small when $\alpha$ is large. This fact is illustrated graphically in FIGS. 22 and 23, exemplifying $\alpha$ large and $\alpha$ small respectively.

From FIG. 21, it can be seen that the maximum value of $\alpha$ that permits any output coupling to be achieved is $$\alpha_{max} = 90° - (\phi_c' - \Theta_c')$$

and from equation (15), the misalignment angle is $$\delta = (90° - \alpha) - \phi'$$

The minimum value of $\phi'$, consistent with keeping $\delta$ small, occurs when $\alpha = \alpha_{max}$; thus from the above two expressions, $$\phi'_{min} = \phi_c' - \Theta_c' - \delta$$

To achieve input coupling requires $|\delta| \leq \Theta_c'$, so that $$\phi'_{min} = \phi_c' - 2\Theta_c'$$

From Snell's law of refraction, (equation (16)) the corresponding minimum angle of incidence measured in air is $$\phi_{min} = \text{arc sin}(n' \sin \phi_{min}')$$

i.e. $\phi_{min} = \text{arc sin}[n' \sin(\phi_c' - 2\Theta_c')]$

Substituting values for the specific example yields $\phi_{min} = 44°$.

From the above considerations, the general useful range of the angle of incidence $\phi$ is $$\text{arc sin}[n' \sin(\phi_c' - 2\Theta_c')] \leq \phi \leq 90°$$

It will be recalled that $\phi_c'$ and $\Theta_c'$ are determined by the refractive indices of the fibre core and cladding materials.

The analysis above has attempted to place limits upon the useful ranges of the fibre end-face angle $\alpha$, and the angle of incidence of the input light beam, $\phi$. A fundamental difficulty arises in that these two parameters are not independent. This fact frustrates attempts to place simple, mathematically derivable, limits on the ranges of values that are of interest for $\alpha$ and $\phi$. However, in selecting a suitable angle of incidence, $\phi$, the following proves helpful.

The basic idea of the bidirectional coupling device is that light is coupled out of the fibre by the process of total internal reflection. In particular, if the fibre end-face is prepared at the so-called "optimum" angle, namely $$\alpha_{opt} = 90° - \phi_c'$$

the axial ray, AB in FIG. 24, is totally internally reflected to C.

To be able to couple light from the external medium, air, through the fibre end-face and back along the fibre axis BA, would violate reciprocity. From the laws of reflection and refraction, it can be argued that this input coupling requirement is fulfilled essentially when $\phi = 90°$, but then the reflectance is 100% and no light enters the fibre core, as seen in FIG. 7.

The practical solution then is to select an angle of incidence, $\phi$, that is as large as possible (approaching 90°) but that introduces only a moderate reflectance. For the specific example described throughout and in which $\alpha = \alpha_{opt}$, the following table of calculated values indicates the trade-offs in reflectance and misalignment angle that are possible.

| Angle of Incidence $\phi°$ | Misalignment Angle $\delta°$ | Reflectance (p polarisation) $r_p$ (%) |
|---|---|---|
| 89 | 0.01 | 86.9 |
| 85 | 0.20 | 49.5 |
| 80 | 0.81 | 23.9 |
| 75 | 1.8 | 10.9 |
| 70 | 3.2 | 4.4 |
| 65 | 4.9 | 1.4 |
| 60 | 6.9 | 0.2 |
| 55 | 9.1 | 0 |

Note that for low values of $\phi$ the reflectance is small, but the misalignment angle is large—hence low or zero input coupling efficiency results. Conversely, for $\phi$ large the misalignment angle is small, but the reflectance increased. In the specific example considered throughout, $\phi = 75°$ was selected as a compromise value that afforded a moderately low input coupling loss due to the reflectance of $r_p = 11\%$, and a tolerable misalignment angle of $\delta = 1.8°$, which is well within the fibre acceptance angle of $\Theta_c' = 7.9°$.

The application of the termination devices of the invention will now be described with reference to specific applications. First, application of the devices to optical time domain reflectometry measurement will be described with reference to FIG. 25.

In this arrangement there is schematically illustrated the end of an optical fibre cut at an angle $\alpha$ to the fibre axis. A polarized source 10 produces an output beam 12 which is directed at the core at an input angle $\phi = 75°$. An input monitoring detector 14 is positioned so as to receive the reflected ray from the fibre end-face. A detector 16 is located so as to receive back-scattered radiation transmitted transversely through the end of the fibre. The arrangement enables testing of the fibre optical loss in a most advantageous manner. For instance, the unwanted fibre front-face reflections which occur in known reflectometry measurement schemes is completely uncoupled from the detector 16 which measures the back scattered power. In addition, as will be apparent from FIG. 25 the reflected beam from the source 10 is monitored by the detector 14 and thus provides a most convenient way of monitoring the input signal especially in cases where the input is a single optical pulse requiring optimization of width, shape and power. Monitoring is essential where the input is an optical pulse sequence and an autocorrelation process is necessary to extract the desired attenuation information from the back-scattered signal. Another advantage of the system is that the input coupling loss is only 0.5 dB with a polarized source. The output coupling loss is approximately 2.1 dB but in most practical arrangements is less than this value. From the foregoing it can be seen that the maximum overall input to output coupling loss is 2.6 dB of optical intensity or 5.2 dB electrical signal power. This compares with a total of 6 dB optical loss or 12 dB electrical signal loss with 3 dB beam splitting arrangements as described previously. Where the fibre loss of the fibre is 2 dB/km, the new coupling scheme will permit the length of fibre to be examined in any single measurement to be increased by 0.85 km while maintaining the same signal to noise ratio as compared with the 3 dB beam splitting circuits for measurement.

Another advantage is the source collimation effect described previously with reference to FIG. 13 and this is seen as a welcome fringe benefit which helps to ensure efficient input coupling with moderately diverging sources.

On the other hand, the system does have some slight limitations in that it requires a polarized source and these are readily achieved with most laser and laser diode sources. An unpolarized source introduces an additional 0.7 dB input coupling loss. The scheme does not permit on axis input coupling but the resulting degradation in coupling efficiency should be almost negligible. As will be apparent from FIG. 4 the back-scattered energy that is not totally internally reflected will be refracted. Of this total refracted energy, which is 4.2 dB below the total back-scattered power, a small fraction may be incident upon the source. The wide divergence of refracted rays (from $\phi = 57.5° - 90°$ for the example considered) means that the back-scattered energy impinging upon the source is small and unlikely to modify source emission. Note also that this problem is worse in the case of the beam splitting arrangement where a signal 3 dB below the total back-scattered intensity and diverging over an angle of $\pm \Theta_c = \arcsin(n' \sin \Theta_c')$ ($\Theta_c = 11.5°$ for the example) is incident upon the source.

Another positive advantage of the arrangement of the invention is that the active area of the detector if placed adjacent to the fibre cladding need only be slightly larger than the fibre core diameter.

The application of the terminations and coupling techniques of the invention will now be described as applied to two-way transmission along a single optical fibre. FIG. 26 illustrates a typical transmission scheme which has a first source 20 producing a first plane polarized input beam 12 which impinges upon the core 3 of an optical fibre having an end termination cut at an angle $\alpha$ to the axis of the fibre. Part of the beam 12 is coupled into the core of the fibre and part of the beam is lost as an unwanted reflected beam 13. At the other end of the fibre a first detector 28 is located so as to receive light transmitted transversely through the termination at the other end of the fibre. The system includes a second source 30 which also produces a plane polarized beam 32 directed at the core of the fibre so as to couple part of the second beam into the fibre and part of the beam being lost in an unwanted reflected beam 34. Light from the second beam 32 is transmitted along the optical fibre and it is detected by a second detector 36 which receives light transversely through the termination at the first end of the fibre.

The advantages of the coupling scheme in this application are as follows:
(i) The unwanted front face reflection from source 20 is completely uncoupled from detector 36 c.f. a reflection that is only 14 dB—fibre attenuation loss below the signal reaching detector 36 from the second source 30 when a 3 dB beamsplitter is used at either fibre end-face.
(ii) An input coupling loss of only 0.5 dB.
(iii) An output coupling loss of less than 2.1 dB.
(iv) An overall input and output optical coupling loss of less than 2.6 dB. This represents an improvement of 6.8 dB electrical power in excess of what can be achieved with beam-splitters.
(v) Again source collimation is a welcome fringe benefit in the case of sources with moderate divergence.

Therefore the terminations of the invention are seen as providing substantial advantages over known arrangements in two-way signal transmission in optical fibres. In practice, the fibre end-face can be cut at a selected angle $\alpha$ by a variety of methods. Most would require that the fibre end-section be strengthened, perhaps by epoxying into a short section of glass capillary tube of, say, five millimeters outside diameter. An attractive alternative approach would be to mould a small, rectangular, plastic block 40 around the end of the fibre. (To facilitate output coupling, the refractive index of the glass tube or plastic should be the same as, or slightly higher than, the fibre cladding material). As illustrated in FIG. 27 the fibre and block are then sawn at the appropriate angle $\alpha$. A brief polish, using an optical quality mechanical polishing powder, applies the required flat, transparent finish to the input and output faces. The advantage of the plastic block is that it provides a convenient method for mounting the detector, as shown in FIG. 28. The transverse ray paths for the mounted detector are as shown in FIG. 12.

I claim:
1. Apparatus for transmission of signals comprising an elongate optical fibre having a core of refractive index n', surrounded by cladding of refractive index $n_c$,
said elongate optical fibre having first and second terminations at first and second ends respectively,
each said termination including a surface through which light is, in use injected into the core of the fibre at an angle $\phi$ relative to a normal to said surface, the surface being arranged such that the longitudinal axis of the core is inclined at an angle $\alpha$ to said surface, and wherein

$$90° - \phi_c' - \theta_c' \leq \alpha \leq 90° - \phi' + \theta_c'$$

where
$\phi_c' = \arcsin(n/n')$
$\theta_c' = \arcsin(2\Delta n_m)^{\frac{1}{2}}$
$\phi' = \arcsin(\sin \phi)/n'$
$\Delta n_m = (n' - n_c)/n'$ and
wherein arc sin $[n' \sin(\phi_c' - 2\theta_c')] \leq \phi \leq 90°$,
a first source of light arranged to inject a first beam of light into said surface of said first termination at a first angle $\phi$ relative to the normal to said surface of the first termination,
a first detector located adjacent to said second termination and arranged to receive components of said first beam which are reflected at said surface of said second termination through the core and cladding of the second termination, a second source of light arranged to inject into said surface of said second termination a second beam of light at a second angle $\phi$ relative to the normal to said surface of the second termination, and a second detector located adjacent to said first termination and arranged to receive components of said second beam which are reflected at said surface of the first termination through the core and cladding of the first termination.

2. Apparatus as claimed in claim 1 wherein $40.7° \leq \alpha \leq 56.5°$.

3. Apparatus for optical time domain reflectometry comprising an elongate optical fibre having a core of refractive index n', surrounded by cladding of refractive index $n_c$, a termination at one extremity thereof, said termination including a surface termination including a surface through which light is, in use injected into the core of the fibre at an angle $\phi$ relative to a normal to said surface, the surface being arranged such that the longitudinal axis of the core is inclined at an angle $\alpha$ to said surface, and wherein $$90° - \phi_c' - \theta_c' \leq \alpha \leq 90° - \phi' + \theta_c'$$

where
$\phi_c' = \text{arc sin } (n/n')$
$\theta_c' = \text{arc sin } (2\Delta n_m)^{\frac{1}{2}}$
$\phi' = \text{arc sin } (\sin \phi/n')$
$\Delta n_m = (n' - n_c)/n'$ and
wherein arc sin $[n' \sin (\phi_c' - 2\theta_c')] \leq \phi \leq 90°$, a source of light for injecting a beam of light into said surface at said angle $\phi$ relative to the normal to said surface and a detector located adjacent to said termination and arranged to receive back-scattered light reflected at said surface through the core and cladding of the termination.

4. Apparatus as claimed in claim 3 wherein said termination is integral with said elongate optical fibre.

5. Apparatus as claimed in claim 3 wherein $40.7° \leq \alpha \leq 56.5°$.

6. Apparatus for transmission of signals comprising an elongate optical fibre having a core of refractive index n', surrounded by cladding of refractive index $n_c$, said elongate optical fibre having first and second terminations at first and second ends respectively, each said termination including a surface through which light is, in use injected into the core of the fibre at an angle $\phi$ relative to a normal to said surface, the surface being arranged such that the longitudinal axis of the core is inclined at an angle $\alpha$ to said surface, and wherein $$90° - \phi_c' - \theta_c' \leq \alpha \leq 90° - \phi' + \Theta_c'$$

where
$\phi_c' = \text{arc sin } (n/n')$
$\theta_c' = \text{arc sin } (2\Delta n_m)^{178}$
$\phi' = \text{arc sin } (\sin \phi/n')$
$\Delta n_m = (n' - n_c)/n'$ and
wherein arc sin $[n' \sin (\phi_c' - 2\theta_c')] \leq \phi \leq 90°$, a first source of light arranged to inject a first beam of light into said surface of said first termination at a first angle $\phi$ relative to the normal to said surface of the first termination, such that said first beam is subjected to refraction at said surface of said first termination and transmission through said core towards said second termination, a first detector located adjacent to said second termination and arranged to receive components of said first beam which are reflected at said surface of said second termination through the core and cladding of the second termination, a second source of light arranged to inject into said surface of said second termination a second beam of light at a second angle $\phi$ relative to the normal to said surface of the second termination, such that said second beam is subjected to refraction at said surface of said second termination and transmission through said core towards said first termination, and a second detector located adjacent to said first termination and arranged to receive components of said second beam which are reflected at said surface of the first termination through the core and cladding of the first termination.

7. Apparatus as claimed in claim 6 wherein $40.7° \leq \alpha \leq 56.5°$.

8. Apparatus as claimed in claim 1 or 6 wherein said beams of light are plane-polarized.

9. Apparatus as claimed in claim 1 or 6 wherein said first and second terminations are integral with said elongate fibre.

10. A method of optical time domain reflectometry testing an elongate optical fibre having a core of refractive index n', surrounded by cladding of refractive index $n_c$, said method including the steps of providing a termination at one end of the fibre, said termination including a surface through which light is, in use injected into the core of the fibre at an angle $\phi$ relative to a normal to said surface, the surface being arranged such that the longitudinal axis of the core is inclined at an angle $\alpha$ to said surface, and wherein $$90° - \phi_c' - \theta_c' \leq \alpha \leq 90° - \phi' + \theta_c'$$

where
$\phi_c' = \text{arc sin } (n/n')$
$\theta_c' = \text{arc sin } (2\Delta n_m)\text{hu } \frac{1}{2}$
$\theta' = \text{arc sin } (\sin \phi/n')$
$\Delta n_m = (n' - n_c)/n'$ and
wherein arc sin $[n' \sin (\phi_c' - 2\theta_c')] \leq \phi \leq 90°$,
injecting a beam of light into said surface, and
detecting back-scattered light reflected at said surface through the core and cladding of the termination.

11. A method as claimed in claim 10 wherein $40.7° \leq \alpha \leq 56.5°$.

12. A method of optical signal transmission in an elongate optical fibre having a core of refractive index n', surrounded by cladding of refractive index $n_c'$, said method including the steps of providing first and second terminations at first and second ends respectively of the elongate optical fibre, each said termination including a surface through which light is, in use injected into the core of the fibre at an angle $\phi$ relative to a normal to said surface, the surface being arranged such that the longitudinal axis of the core is inclined at an angle $\alpha$ to said surface, and wherein $$90° - \phi_c' - \theta_c' \leq \alpha \leq 90° - \phi' + \theta_c'$$

wherein $\phi_c' = \arcsin(n/n')$
$\theta_c' = \arcsin(2\Delta n_m)^{1/2}$
$\phi' = \arcsin(\sin\phi/n')$
$\Delta n_m = (n'-n_c)/n'$ and
wherein $\arcsin[n'\sin(\phi_c'-2\theta_c')] \leq \phi \leq 90°$,
injecting a first beam of light into said surface of said first termination,
detecting components of said first beam which are reflected at said surface of said second termination through the core and cladding of the second termination,
injecting a second beam of light into said surface of said second termination, and
detecting components of said second beam which are reflected at said surface of said first termination through the core and cladding of the first termination.

13. A method as claimed in claim 12 wherein $40.7° \leq \alpha \leq 56.5°$.

14. A method of optical signal transmission in an elongate optical fibre having a core of refractive index n', surrounded by cladding of refractive index $n_c$, said method including the steps of
providing first and second terminations at first and second ends respectively of the elongate optical fibre, each said termination including a surface through which light is, in use injected into the core of the fibre at an angle $\phi$ relative to a normal to said surface, the surface being arranged such that the longitudinal axis of the core is inclined at an angle $\alpha$ to said surface, and wherein $90° - \phi_c' - \theta_c' \leq \alpha \leq 90° - \phi' + \theta_c'$ where
$\phi_c' = \arcsin(n/n')$
$\theta_c' = \arcsin(2\Delta n_m)^{1/2}$
$\phi' = \arcsin(\sin\phi/n')$
$\Delta n_m = (n'-n_c)/n'$ and
wherein $\arcsin[n'\sin(\phi_c'-2\theta_c')] \leq \phi \leq 90°$,
injecting a first beam of light into said surface of said first termination, such that said first beam is subjected to refraction at said surface of said first termination and transmission through said core towards said second termination,
detecting components of said first beam which are reflected at said surface of said second termination through the core and cladding of the second termination,
injecting a second beam of light into said surface of said second termination such that said second beam is subjected to refraction at said surface of said second termination and transmission through said core towards said first termination, and
detecting components of said second beam which are reflected at said surface of said first termination through the core and cladding of the first termination.

15. A method as claimed in claim 14 wherein $40.7° \leq \alpha \leq 56.5°$.

16. A method as defined in claim 12 or 14 wherein said beams of light are plane-polarized.

* * * * *

UNITED STATES PATENT AND TRADEMARK OFFICE
CERTIFICATE OF CORRECTION

PATENT NO. : 4,381,882
DATED : May 3, 1983
INVENTOR(S) : Percy V. H. Sabine

It is certified that error appears in the above-identified patent and that said Letters Patent are hereby corrected as shown below:

Column 8, line 5, "of" should be --to--.

Column 15, line 2, "ffor" should --for--.

Column 19, line 60, "$\theta_c' = \arc\sin (2\Delta n_m)^{178}$" should be -- $\theta_c' = \arc\sin (2\Delta n_m)^{\frac{1}{2}}$ --.

Column 20, line 44, "$\theta_c' = \arc\sin (2\Delta n_m) hu \frac{1}{2}$" should be -- $\theta_c' = \arc\sin (2\Delta n_m)^{\frac{1}{2}}$ --.

Signed and Sealed this

Eighteenth Day of October 1983

[SEAL]

Attest:

GERALD J. MOSSINGHOFF

Attesting Officer

Commissioner of Patents and Trademarks